United States Patent [19]
Ozaki et al.

[11] Patent Number: 5,799,261
[45] Date of Patent: Aug. 25, 1998

[54] ANTI-SKID CONTROL SYSTEM FOR AUTOMOTIVE VEHICLES

[75] Inventors: Yuji Ozaki, Zama; Kenji Ogino, Ishibashi, both of Japan

[73] Assignee: Nissan Motor Co., Ltd., Kanagawa, Japan

[21] Appl. No.: 583,884

[22] Filed: Jan. 11, 1996

[30] Foreign Application Priority Data

Jan. 13, 1995 [JP] Japan ................... 7-004468

[51] Int. Cl.$^6$ .................. B60T 8/58; B60T 8/62
[52] U.S. Cl. .................. 701/78; 701/79; 701/72; 303/171; 303/187
[58] Field of Search ............ 364/426.016, 426.018, 364/426.023, 426.024; 303/167, 169, 171, 173, 187, 189; 701/72, 74, 78, 79

[56] References Cited

U.S. PATENT DOCUMENTS

| | | | |
|---|---|---|---|
| 5,005,132 | 4/1991 | Yoshino | 364/426.02 |
| 5,124,921 | 6/1992 | Jonner et al. | 364/426.01 |
| 5,140,524 | 8/1992 | Matsuda | 364/426.02 |
| 5,344,223 | 9/1994 | Sugawara et al. | 303/103 |
| 5,373,447 | 12/1994 | Howes et al. | 364/426.03 |
| 5,447,364 | 9/1995 | Sakane et al. | 303/169 |
| 5,488,557 | 1/1996 | Matsuda | 364/426.02 |
| 5,570,936 | 11/1996 | Ohmori et al. | 303/170 |
| 5,641,209 | 6/1997 | Kushi et al. | 303/9.71 |

*Primary Examiner*—Michael Zanelli
*Attorney, Agent, or Firm*—McDermott, Will & Emery

[57] ABSTRACT

An anti-skid control system for an automotive vehicle, comprises a plurality of actuators each associated with one of front-left, front-right, rear-left and rear-right road wheels, for adjusting braking forces applied to the road wheels independently of each other, sensors for detecting wheel speeds of the road wheels to generate wheel-speed indicative signals, and a controller for controlling the actuators in response to the wheel-speed indicative signals. The controller selects a lower value of the wheel-speed indicative signal values of a controlled rear wheel, subjected to a braking-force control, and its diagonal front wheel located on the vehicle diagonally to the controlled rear wheel, and controls the actuator associated with the controlled rear wheel in accordance with the lower value, during braking-force control for the controlled rear wheel.

6 Claims, 8 Drawing Sheets

ANTI-SKID CONTROL SYSTEM FOR AUTOMOTIVE VEHICLES

BACKGROUND OF THE INVENTION

1. Field of the Invention

The present invention relates to an automotive anti-skid control system which prevents skidding and thus provides maximum effective braking and assures steering effect on turns by optimally controlling each wheel-brake cylinder pressure, and specifically to a system which can optimally control a braking force applied to a turning outer rear wheel during braking when the car is rounding a curve and effectively suppress undesired yawing moment exerted on the vehicle during traveling on a so-called split-μ road.

2. Description of the Prior Art

As is generally known, on conventional automotive anti-skid control systems which can prevent wheel-lock during braking, each wheel-brake cylinder pressure is optimally controlled by adjusting a slip ratio at the slipping less-traction wheel towards a predetermined reference slip ratio. The slip ratio at the slipping less-traction wheel which is subjected to anti-skid control, is generally derived from the ratio of the deviation between a vehicle speed and a wheel speed detected at the slipping less-traction wheel with respect to the vehicle speed. On the other hand, the predetermined reference slip ratio means a desired ideal slip ratio advantageous to provide a maximum traction (maximum possible friction between the road surface and the tire) and to assure both a steering effect on turns and a shorter braking distance during braking. For instance, when the derived slip ratio at the slipping less-traction wheel exceeds the reference slip ratio, the brake-fluid pressure to the associated wheel-brake cylinder is reduced so as to prevent skidding or wheel-lock. In contrast, when the slip ratio becomes less than the reference slip ratio owing to the above-mentioned reduction of the wheel-brake cylinder pressure, the wheel-cylinder pressure is built up again so as to adjust the slip ratio towards the reference slip ratio. The braking force at the slipping less-traction wheel, which is subjected to anti-skid brake control, can be adjusted by automatically controlling the braking operation as if automatic pumping brake action is executed in cycles.

In case that the anti-skid control is made with respect to left and right rear wheels (unsteered wheels) during braking when the vehicle is traveling on a so-called split-μ road in which friction coefficients of left and right road surfaces are remarkably different from each other, for example the right-hand side road surface is a low-μ road, whereas the left-hand side road surface is a high-μ road, there is a braking-force difference between rear-left and rear-right wheels owing to the split-μ road. During braking on the split-μ road, the wheel speed of the slipping less-traction rear wheel (of a high possibility of wheel-lock and of a greater slip ratio) tends to become slower, while the wheel speed of the almost non-slipping greater-traction rear wheel of a less slip ratio tends to become faster. In this case, the conventional anti-skid control system controls rear-left and rear-right wheels simultaneously and in common with each other at the same antiskid control mode in which the respective wheel-brake cylinder pressures of the rear wheels are controlled on the basis of data indicative of a slip ratio detected or estimated at one of rear wheels, namely the slipping less-traction rear wheel, (i.e., the slower-rotating rear wheel). Such an anti-skid control common to the rear wheels is often called a "select-LOW method" or a "select-LOW process". The select-LOW method is effective to enhance a steering stability and a controllability by reducing undesired yawing moment, when the anti-skid control is executed simultaneously at the rear wheels in common with each other during braking on the split-μ road. However, in the event that the rear wheels are simultaneously controlled in common with each other by way of the select-LOW method during braking on turns, the faster-turning outer rear wheel is also controlled in accordance with the same anti-skid control mode as the slower-turning inner rear wheel, irrespective of the fact that the outer rear wheel has a less possibility of wheel-lock than the inner rear wheel owing to shift of wheel-load from the inner rear wheel to the outer rear wheel. In this case, the braking force to be produced at the outer rear wheel tends to be suppressed unintendedly and excessively, thereby reducing the total braking force of the vehicle (the four wheels) and thus increasing the braking distance. To avoid this, Japanese Patent First Publication (Tokkai Heisei) No. 4-339065 (corresponding to Japanese Patent Application No. 3-139436, and to U.S. patent application Ser. No. 883,017, filed May 14, 1992 and assigned to the assignee of the present invention) has disclosed an anti-skid control depending on the magnitude of lateral acceleration. In the U.S. patent application Ser. No. 883,017, the system employs a lateral-acceleration sensor for detecting a lateral acceleration exerted on the vehicle. When the magnitude of the lateral acceleration detected is small, rear-left and rear-right wheels are simultaneously controlled in accordance with the common antiskid control mode based on a comparatively greater slip ratio detected at the slipping less-traction rear wheel. In contrast, when the magnitude of the lateral acceleration detected is great, the rear-left wheel and the rear-right wheel are controlled independently of each other on the basis of the respective slip ratios. In other words, the prior art system disclosed in the U.S. patent application Ser. No. 883,017 teaches the provision of a lateral-acceleration dependent anti-skid control mode selection means. In general, such a lateral-acceleration sensor is expensive. In order to enhance reliability in the anti-skid control, the prior art system may also require a fail-safe system in consideration of failure in the lateral-acceleration sensor, thus increasing total production costs of anti-skid control systems.

SUMMARY OF THE INVENTION

Accordingly, it is an object of the invention to provide an improved anti-skid control system for automotive vehicles which avoids the foregoing disadvantages of the prior art.

It is an object of the invention to provide an automobile anti-skid control system which can prevent a braking force to be produced at a faster-turning outer rear wheel from being suppressed excessively during braking on turns without providing an expensive lateral acceleration.

It is another object of the invention to provide an inexpensive automobile anti-skid control system which can ensure an optimal anti-skid control irrespective of during turning or during straight-ahead driving on a split-μ road.

In order to accomplish the aforementioned and other objects of the invention, an anti-skid control system for an automotive vehicle comprises a plurality of actuators each associated with one of four road wheels located respectively at front-left, front-right, rear-left and rear-right positions of the vehicle, for adjusting braking forces applied to the four road wheels independently of each other, sensor means for detecting wheel speeds of the four road wheels to generate wheel-speed indicative signals, and control means for controlling the actuators in response to the wheel-speed indicative signals, wherein the control means includes means for controlling the actuator associated with a controlled rear wheel of the four road wheels, which controlled rear wheel is subjected to a braking-force control, by reference to both a value of the wheel-speed indicative signal of the controlled rear wheel and a value of the wheel-speed indicative signal of its diagonal front wheel located on the vehicle diagonally to the controlled rear wheel, during the braking-force control for the controlled rear wheel. Thus, even when there is a tendency of lack of a braking force applied to the controlled rear wheel during the braking-force control for the rear-wheel side, since the braking force of a rear wheel of two road wheels arranged diagonally to each other can be properly adjusted to the braking force of a front wheel of the diagonal road wheel pair, the system can eliminate lack of the braking force applied to the rear outer road wheel turning during braking on turns, and suppress a difference between braking forces applied to the rear-left and rear-right road wheels during traveling on a split-μ road.

According to another aspect of the invention, an anti-skid control system for an automotive vehicle comprises a plurality of actuators each associated with one of four road wheels located respectively at front-left, front-right, rear-left and rear-right positions of the vehicle, for adjusting braking forces applied to the four road wheels independently of each other, sensor means for detecting wheel speeds of the four road wheels to generate wheel-speed indicative signals, and control means for controlling the actuators in response to the wheel-speed indicative signals, wherein the control means includes means for selecting a lower value of both a value of the wheel-speed indicative signal of a controlled rear wheel of the four road wheels, which controlled rear wheel is subjected to a braking-force control, and a value of the wheel-speed indicative signal of its diagonal front wheel located on the vehicle diagonally to the controlled rear wheel, and for controlling the actuator associated with the controlled rear wheel in accordance with the lower value, during braking-force control for the controlled rear wheel. The system can execute a so-called select-LOW process between one diagonal road wheel pair, namely front-left and rear-right road wheels, or between another diagonal road wheel pair, namely front-right and rear-left road wheels. Therefore, during braking on turns, the braking force applied to the faster-rotating rear outer road wheel (of the second lightest wheel load) can be maintained at a value essentially equivalent to the braking force applied to the slower-rotating front inner road wheel (of the second heaviest wheel load), thus effectively decreasing a braking distance. During traveling on the split-μ road, the braking force applied to the rear road wheel rotating on the high-μ road can be properly adjusted to a comparatively small braking force applied to the front road wheel rotating on the low-μ road, thus suppressing a braking-force difference between the rear-left and rear-right wheels.

According to a further aspect of the invention, an anti-skid control system for an automotive vehicle comprises a plurality of actuators each associated with one of four road wheels located respectively at front-left, front-right, rear-left and rear-right positions of the vehicle, for adjusting braking forces applied to the four road wheels independently of each other, sensor means for detecting wheel speeds of the four road wheels to generate wheel-speed indicative signals, and control means for controlling the actuators in response to the wheel-speed indicative signals, wherein the control means executes different braking-force control processes in case of a front-wheel side of the four road wheels and in case of a rear-wheel side of the four road wheels, and the control means includes means for simultaneously controlling the actuator associated with a diagonal rear wheel located on the vehicle diagonally to a controlled front wheel of the four road wheels at a pressure-reduction mode in synchronization with shifting (a pressure-reduction timing) of the actuator associated with the controlled front wheel to the pressure-reduction mode, only when the pressure-reduction mode is selected during the braking-force control process for the controlled front wheel. Owing to the synchronized pressure-reduction timing between the diagonal road wheel pair, a driving stability of the vehicle can be enhanced during traveling on the split-μ road. During braking on turns, the frequency of setting the control mode of the faster-rotating rear outer road wheel to the pressure-reduction mode can be adjusted to a less frequency in comparison with the select-LOW process, with the result that unintended lack of the braking force applied to the rear-outer road wheel can be effectively eliminated.

According to a still further aspect of the invention, an antiskid control system for an automotive vehicle comprises a plurality of actuators each associated with one of four road wheels located respectively at front-left, front-right, rear-left and rear-right positions of the vehicle, for adjusting braking forces applied to the four road wheels independently of each other, sensor means for detecting wheel speeds of the four road wheels to generate wheel-speed indicative signals, control means for controlling the actuators in response to the wheel-speed indicative signals, and decision means for deciding whether a traveling condition of the vehicle corresponds to a particular condition in which a great wheel-load difference between inner and outer wheels occurs during braking on turns, wherein the control means executes different braking-force control processes in case of a front-wheel side of the four road wheels and in case of a rear-wheel side of the four road wheels, and the control means includes means for controlling the actuator associated with a controlled rear wheel of the four road wheels, which controlled rear wheel is subjected to a braking-force control, by reference to both a value of the wheel-speed indicative signal of the controlled rear wheel and a value of the wheel-speed indicative signal of its diagonal front wheel located on the vehicle diagonally to the controlled rear wheel when the decision means decides that the particular condition is satisfied during the braking-force control process for the controlled rear wheel, and for controlling rear wheels of the four road wheels in common with each other in accordance with a lower one of values of the wheel-speed indicative signals of the rear wheels when the decision means decides that the particular condition is unsatisfied during the braking-force control for the rear-wheel side.

According to another aspect of the invention, an anti-skid control system for an automotive vehicle comprises a plurality of actuators each associated with one of four road wheels located respectively at front-left, front-right, rear-left and rear-right positions of the vehicle, for adjusting braking forces applied to the four road wheels independently of each other, sensor means for detecting wheel speeds of the four road wheels to generate wheel-speed indicative signals, control means for controlling the actuators in response to the wheel-speed indicative signals, and decision means for deciding whether a traveling condition of the vehicle corresponds to a particular condition in which a great wheel-load difference between inner and outer wheels occurs during braking on turns, wherein the control means executes different braking-force control processes in case of a front-wheel side of the four road wheels and in case of a rear-wheel side of the four road wheels, and the control means includes means for simultaneously controlling the actuator associated with a diagonal rear wheel located on the vehicle diagonally to a controlled front wheel of the four road wheels at a pressure-reduction mode in synchronization with shifting of the actuator associated with the controlled front wheel to the pressure-reduction mode only when the particular condition is satisfied and the pressure-reduction mode is selected during the braking-force control process for the controlled front wheel, and for controlling rear wheels of the four road wheels in common with each other in accordance with a lower one of values of the wheel-speed indicative signals of the rear wheels when the decision means decides that the particular condition is unsatisfied during the braking-force control for the rear-wheel side.

According to another aspect of the invention, an anti-skid control system for an automotive vehicle comprises a plurality of actuators each associated with one of four road wheels located respectively at front-left, front-right, rear-left and rear-right positions of the vehicle, for adjusting braking forces applied to the four road wheels independently of each other, sensor means for detecting wheel speeds of the four road wheels to generate wheel-speed indicative signals, pseudo vehicle speed generating means for estimating a pseudo vehicle speed as a function of at least a highest one of values of the wheel-speed indicative signals, means for calculating slip ratios of the road wheels as a function of the pseudo vehicle speed and each of the wheel-speed indicative signal values, control means for controlling the actuators in response to the slip ratios, and decision means for deciding whether a traveling condition of the vehicle corresponds to a particular condition in which a great wheel-load difference between inner and outer wheels occurs during braking on turns, wherein the control means executes different braking-force control processes in case of a front-wheel side of the four road wheels and in case of a rear-wheel side of the four road wheels, and the control means includes means for simultaneously controlling the actuator associated with a diagonal rear wheel located on the vehicle diagonally to a controlled front wheel of the four road wheels at a pressure-reduction mode in synchronization with shifting of the actuator associated with the controlled front wheel to the pressure-reduction mode only when the particular condition is satisfied and the pressure-reduction mode is selected during the braking-force control process for the controlled front wheel, and for controlling rear wheels of the four road wheels in common with each other in accordance with a slip ratio calculated as a function of the pseudo vehicle speed and a lower one of the wheel-speed indicative signal values of the rear wheels when the decision means decides that the particular condition is unsatisfied during the braking-force control for the rear-wheel side. The particular condition may be based on whether the pseudo vehicle speed exceeds a preset speed. As set out above, since the system can further consider the particular traveling condition in which a great wheel-load difference will occur during braking on turns, the system can ensure a more precise anti-skid control.

DESCRIPTION OF THE PREFERRED EMBODIMENTS

First Embodiment

Figure 1:
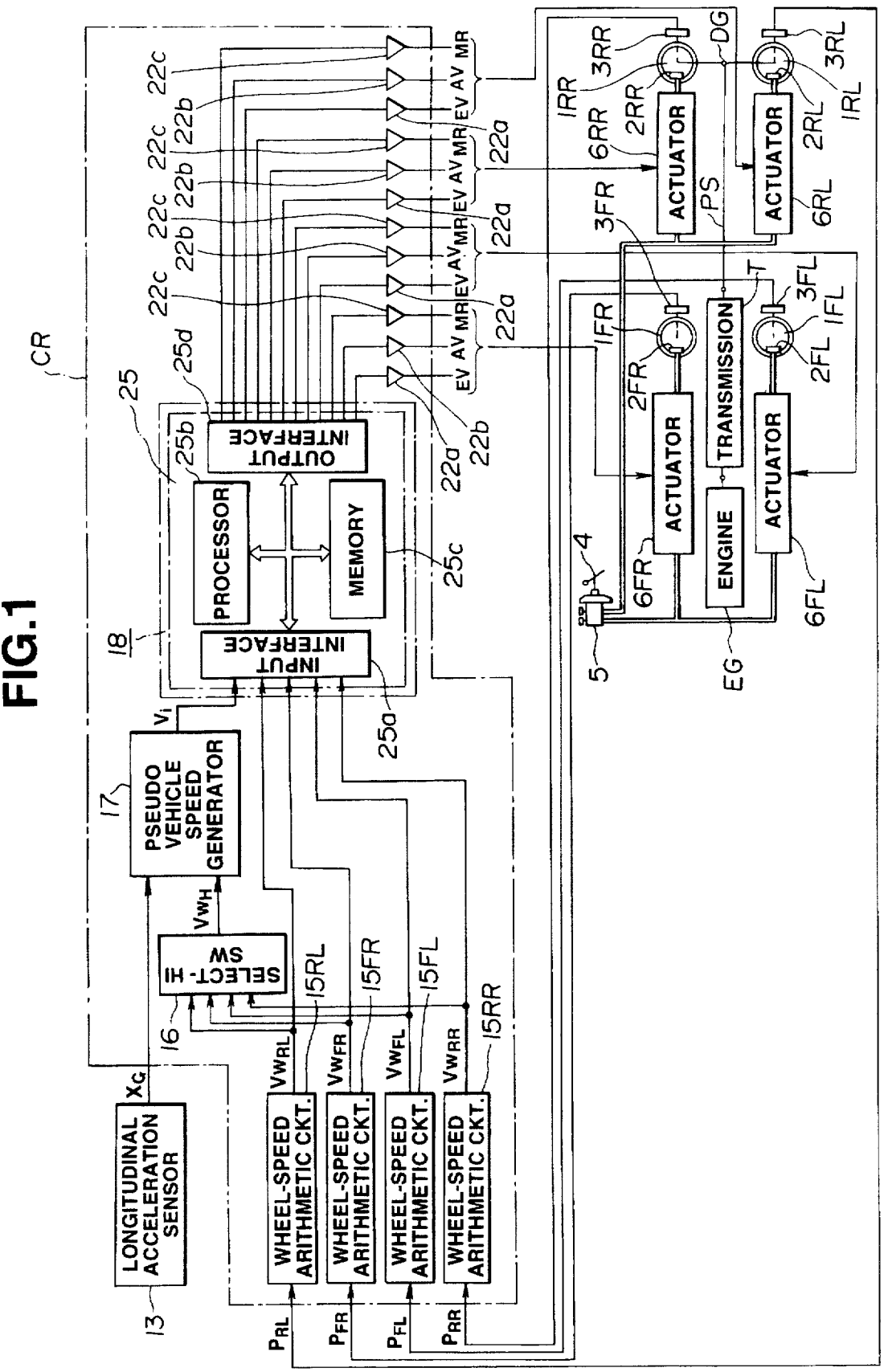
FIG. 1 is a block diagram illustrating one embodiment of an anti-skid control system according to the present invention.
Figure 2:
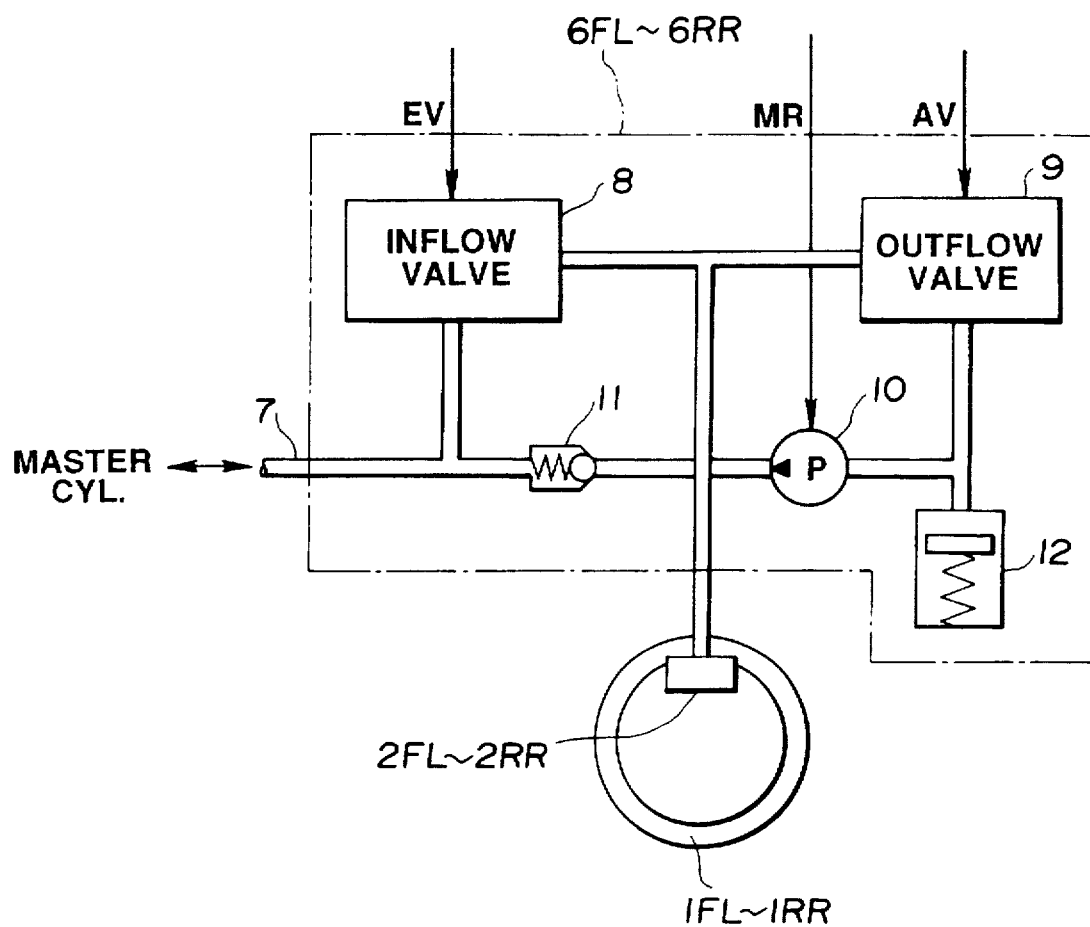
FIG. 2 is a hydraulic circuit diagram illustrating one embodiment of a hydraulic actuator incorporated in the anti-skid control system shown in FIG. 1.

Referring now to the drawings, particularly to FIGS. 1 and 2, the anti-skid control system of the invention is exemplified in case of a four-channel type anti-skid control system for a front-engine, rear-wheel drive vehicle. As seen in FIG. 1, engine power produced by an engine EG is transmitted through a transmission T and a propeller shaft PS, and distributed to rear-left and rear-right drive wheels 1RL and 1RR by means of a rear differential DG. Reference numerals 1FL and 1FR denote a front-left driven wheel and a front-right driven wheel, respectively. Wheel-brake cylinders 2FL, 2FR, 2RL and 2RR are provided at the road wheels 1FL, 1FR, 1RL and 1RR, respectively. Front-left, front-right, rear-left and rear-right wheel-speed sensors 3FL, 3FR, 3RL and 3RR are respectively provided at the front-left road wheel 1FL, the front-right road wheel 1FR, the rear-left road wheel 1RL and rear-right road wheel 1RR, so as to generate a pulse signal PFL indicative of the number of revolutions at the front-left road wheel 1FL, a pulse signal PFR indicative of the number of revolutions at the front-right road wheel 1FR, a pulse signal PRL indicative of the number of revolutions at the rear-left road wheel 1RL and a pulse signal PRR indicative of the number of revolutions at the rear-right road wheel 1RR. The front-left wheel-speed sensor 3FL, the front-right wheel-speed sensor 3FR, the rear-left wheel-speed sensor 3RL and the rear-right wheel-speed sensor 3RR are connected to a front-left wheel-speed arithmetic circuit 15FL, a front-right wheel-speed arithmetic circuit 15FR, a rear-left wheel-speed arithmetic circuit 15RL and a rear-right wheel-speed arithmetic circuit 15RR, respectively. Reference numeral 5 denotes a tandem master cylinder with two pistons, set in tandem. In the dual-brake system with the tandem master cylinder 5, a master cylinder pressure which pressure is developed by depression of a brake pedal 4 and generated from one port of the master cylinder is fed to the front-wheel side, while a master-cylinder pressure which pressure is developed by depression of the brake pedal 4 and generated from the other port of the master cylinder is fed to the rear-wheel side. In the front wheel brakes, the master-cylinder pressure from the one port is fed through a front-left wheel side hydraulic actuator 6FL to the front-left wheel-brake cylinder 2FL and also fed through a front-right wheel side hydraulic actuator 6FR to the front-right wheel-brake cylinder 2FR. Thus, the wheel-cylinder pressures in the front-left and front-right wheel-brake cylinders 2FL and 2FR can be regulated independently of each other, by means of the two hydraulic actuators 6FL and 6FR. In the rear wheel brakes, the master-cylinder pressure from the other port is fed through a rear-left wheel side hydraulic actuator 6RL to the rear-left wheel-brake cylinder 2RL and also fed through a rear-right wheel side hydraulic actuator 6RR to the rear-right wheel-brake cylinder 2RR. Thus, the wheel-cylinder pressures in the rear-left and rear-right wheel-brake cylinders 2RL and 2RR can be regulated independently of each other, by means of the two hydraulic actuators 6RL and 6RR. As shown in FIG. 2, each of the actuators 6FL, 6FR, 6RL and 6RR includes an electromagnetic inflow valve 8 fluidly disposed between a hydraulic conduit 7 connected to the master cylinder 5 and the associated wheel-brake cylinder, an electromagnetic outflow valve 9 fluidly disposed in parallel with the inflow valve 8, an oil pump 10, a one-way check valve 11, and a pressure accumulator 12 fluidly disposed between the outlet port of the outflow valve 9 and the inlet port of the oil pump 10. The oil pump 10 serves as a return pump which returns the wheel-cylinder pressure towards the hydraulic conduit 7 in the pressure-reduction mode of the anti-skid control, while the pressure accumulator 12 is provided for temporarily accumulating a portion of the brake fluid pressure extracted from the wheel-brake cylinder during anti-skid control. The oil pump 10 and the check valve 11 are provided in series to each other and fluidly disposed between the inlet port of the inflow valve 8 and the outlet port of the outflow valve 9. In one exemplified hydraulic actuator shown in FIG. 2, although the oil pump 10 and the accumulator 12 are provided in one hydraulic actuator, the oil pump 10 and the accumulator 12 may be commonized in the respective actuators 6FL, 6FR, 6RL and 6RR. In case of commonization of both the oil pump 10 and the pressure accumulator 12, it will be appreciated that additional directional control valves are required for controlling inflow and outflow of brake fluid pressure to and from the pump 10 and the accumulator 12.

Returning to FIG. 1, a controller CR receives a longitudinal acceleration signal $X_G$ from a longitudinal acceleration sensor 13 attached to the vehicle body, in addition to the four pulse signals $P_{FL}$, $P_{FR}$, $P_{RL}$ and $P_{RR}$, and then generates three fluid-pressure control signals EV, AV and MR. As best seen in FIG. 2, the fluid-pressure control signals EV, AV and MR are fed to each actuator, in such a manner as to control the inflow valve 8 by the signal EV, to control the outflow valve 9 by the signal AV, and to control the oil pump 10 by the signal MR. The longitudinal acceleration sensor 13 is provided for detecting an acceleration or a deceleration exerted on the vehicle body in the longitudinal direction of the vehicle. The longitudinal acceleration sensor 13 is so designed as to output null voltage in case that there is no longitudinal acceleration exerted on the vehicle body, and to output a positive voltage in case that there is a positive longitudinal acceleration acting on the vehicle body in the vehicle forward direction, and to output a negative voltage in case that there is a deceleration corresponding to a negative longitudinal acceleration acting on the vehicle body in the vehicle backward direction. The controller CR includes four wheel-speed arithmetic circuits 15FL, 15FR, 15RL and 15RR, respectively receiving the revolution-speed indicative pulse signals $P_{FL}$, $P_{FR}$, $P_{RL}$ and $P_{RR}$ from the wheel-speed sensors 3FL, 3FR, 3RL and 3RR. The respective wheel-speed arithmetic circuits 15FL, 15FR, 15RL and 15RR derive a front-left wheel speed, a front-right wheel speed, a rear-left wheel speed and a rear-right wheel speed on the basis of the four pulse signals $P_{FL}$, $P_{FR}$, $P_{RL}$ and $P_{RR}$ and the outside radius of each road wheel which is rotating, so as to generate a front-left wheel speed indicative signal $V_{WFL}$, a front-right wheel speed indicative signal $V_{WFR}$, a rear-left wheel speed indicative signal $V_{WRL}$ and a rear-right wheel speed indicative signal $V_{WRR}$. The wheel-speed indicative signals $V_{WFL}$, $V_{WFR}$, $V_{WRL}$ and $V_{WRR}$ represent a peripheral speed at the front-left road wheel 1FL, a peripheral speed at the front-right road wheel 1FR, a peripheral speed at the rear-left road wheel 1RL and a peripheral speed at the rear-right road wheels 1RR, respectively. The derived wheel-speed indicative signals $V_{WFL}$, $V_{WFR}$, $V_{WRL}$ and $V_{WRR}$ are supplied to an input interface 25a of a wheel-brake cylinder pressure control circuit 18 as hereinbelow described in detail. The controller CR includes a select-HIGH switch 16 for selecting the highest one of the wheel-speed indicative signals $V_{Wj}$ (j=FL, FR, RL, RR) as a select-HIGH wheel speed indicative signal $V_{WH}$. The controller CR includes a pseudo vehicle speed generator 17 which receives the select-HIGH wheel speed indicative signal $V_{WH}$ and the longitudinal acceleration indicative signal $X_G$ and estimates or calculates a pseudo vehicle speed on the basis of these signals $V_{WH}$ and $X_G$ to produce a pseudo vehicle speed indicative signal Vi. The controller CR also includes the wheel-brake cylinder pressure control circuit 18 which circuit receives the longitudinal acceleration indicative signal $X_G$ from the longitudinal acceleration sensor 13, the pseudo vehicle speed indicative signal Vi from the pseudo vehicle speed generator 17, and the wheel-speed indicative signals $V_{WFL}$, $V_{WFR}$, $V_{WRL}$ and $V_{WRR}$ from the wheel-speed arithmetic circuits 15FL, 15FR, 15RL and 15RR, for the purpose of the anti-skid control executed during braking. The output interface 25d of the wheel-brake cylinder pressure control circuit 18 outputs a plurality of control signals through four sets of drive circuits to the respective actuators 6FL, 6FR, 6RL and 6RR, so as to properly control the wheel-cylinder pressures at the respective wheel-brake cylinders 2FL, 2FR, 2RL and 2RR. As seen in FIG. 1, each drive-circuit set is constructed by three different drive circuits, namely a first drive circuit 22a provided for generating the fluid-pressure control signal EV to the inflow valve 8, a second drive circuit 22b provided for generating the fluid-pressure control signal AV to the outflow valve 9, and a third drive circuit 22c provided for generating the fluid-pressure control signal MR to the oil pump 10. Since the fluid-pressure control signal MR is set at a binary "1" only when the anti-skid control system comes into operation, the control signal MR can be referred to as an "anti-skid control system operating-state indicative signal" which will be hereinafter abbreviated to an "ABS operating-state indicative signal".

The pseudo vehicle speed generator 17 which is employed in the anti-skid control system of the invention, has the same construction as a pseudo vehicle speed generator which has been disclosed in the Japanese Patent Provisional Publication (Tokkai Heisei) No. 2-306863 (corresponding to U.S. Pat. No. 5,140,524, issued Aug. 18, 1992 and assigned to the assignee of the present invention), the teachings of which are hereby incorporated by reference. The construction of the pseudo vehicle speed generator 17 hereinbelow explained in brief.

The pseudo vehicle speed generator 17 utilizes at least the select-HIGH wheel speed indicative signal $V_{WH}$ and the longitudinal acceleration indicative signal $X_G$ for the purpose of estimation of the pseudo vehicle speed. Actually, the pseudo vehicle speed generator 17 includes a sample-and-hold circuit for sampling and holding a select-HIGH wheel speed indicative signal $V_{WH}$ selected by the select-HIGH switch 16 as an input signal when the ignition switch is turned ON, and for temporarily estimating it as the pseudo vehicle speed Vi. Ordinarily, a predetermined dead band is provided for optimally updating the pseudo vehicle speed Vi. When a newly sampled select-HIGH wheel speed indicative signal $V_{WH}$ exceeds the upper limit of the predetermined dead band or when the newly sampled select-HIGH wheel speed indicative signal $V_{WH}$ becomes less than the lower limit of the predetermined dead band, the newly sampled select-HIGH wheel speed indicative signal $V_{WH}$ is held as a new input signal. For example, when the newly sampled select-HIGH wheel speed indicative signal $V_{WH}$ exceeds the upper limit of the predetermined dead band, the pseudo vehicle speed Vi is estimated by adding an integrated value of a voltage equivalent to a preset wheel acceleration to the sampled select-HIGH wheel speed indicative signal $V_{WH}$. When the newly sampled select-HIGH wheel speed indicative signal $V_{WH}$ is less than the lower limit of the predetermined dead band, the pseudo vehicle speed Vi is estimated by subtracting an integrated value of the sum of the absolute value of the longitudinal acceleration signal value $X_G$ from the sensor 13 and a predetermined offset value from the sampled select-HIGH wheel speed indicative signal $V_{WH}$. In lieu thereof, the select-HIGH wheel speed indicative signal $V_{WH}$ itself may be regarded as the pseudo vehicle speed Vi. Alternatively, Japanese Patent Provisional Publication (Tokkai Showa) No. 61-285163 teaches another arithmetic processing for a pseudo vehicle speed used for an anti-skid brake control. The system disclosed in the Japanese Patent Provisional Publication No. 61-285163, includes a sample-and-hold circuit for sampling and holding a select-HIGH wheel speed indicative signal $V_{WH}$ as an input signal upon initiation of braking action, and a differentiator for differentiating the select-HIGH wheel speed indicative signal value to estimate a longitudinal acceleration exerted on the vehicle. As may be appreciated, the pseudo vehicle speed Vi can be derived on the basis of the select-HIGH wheel speed indicative signal $V_{WH}$ and the estimated longitudinal acceleration. In this case, the longitudinal acceleration sensor can be eliminated.

On the basis of each of the wheel-speed indicative signal values $V_{WFL}$, $V_{WFR}$, $V_{WRL}$ and $V_{WRR}$, and the pseudo vehicle speed indicative signal value Vi, the wheel-brake cylinder pressure control circuit 18 controls all the actuators 6FL, 6FR, 6RL and 6RR which adjust the brake-fluid pressures in the respective wheel-brake cylinders 2FL, 2FR, 2RL and 2RR. As seen in FIG. 1, the wheel-brake cylinder pressure control circuit 18 comprises a microcomputer 25 including at least the input interface 25a having an analogue-to-digital conversion function, the output interface 25d having a digital-to-analogue conversion function, an arithmetic processor 25b, and a memory 25c. The processor 25b of the wheel-brake cylinder pressure control circuit 18 derives the slip ratio of each road wheel on the basis of the wheel-speed indicative signal values Vwj (j=FL, FR, RL, RR) and the pseudo vehicle speed indicative signal value Vi. The processor 25b of the pressure control circuit 18 also functions to derive a positive and negative acceleration/deceleration indicative signal V'wj (j=FL, FR, RL, RR) at each road wheel which signal V'wj is obtained by differentiating the wheel-speed indicative signal value Vwj at each road wheel, or by dividing the deviation between the current value of the wheel-speed indicative signal value Vwj and the previous value of the wheelspeed indicative signal value Vwj by an elapsed time (a predetermined sampling time interval). The positive and negative acceleration/deceleration indicative signal V'wj will be hereinafter referred to as a "wheel acceleration/deceleration indicative signal". The processor 25b compares a calculated value λ of the slip ratio at each road wheel with a first reference slip ratio λ1 which is preselected in consideration of both a wheel-cylinder pressure build-up timing and a wheel-cylinder pressure-reduction timing and corresponds to an ideal slip ratio or a target slip ratio. Additionally, the processor 25b compares the calculated value λ of the slip ratio at each road wheel with a second reference slip ratio λ2 pre-set at a greater slip ratio than the first reference slip ratio λ1. As explained later, the processor 25b compares the derived wheel acceleration/deceleration indicative signal V'wj (j=FL, FR, RL, RR) with a predetermined negative threshold b1 for a deceleration of the road wheel which deceleration corresponds to an angular deceleration of the road wheel, or with a predetermined positive threshold a for an acceleration of the road wheel which acceleration corresponds to an angular acceleration of the road wheel. In other words, the negative threshold b1 corresponds substantially to a threshold necessary for the pressure-reduction start timing, while the positive threshold a corresponds substantially to a threshold necessary for the pressure build-up start timing. In more detail, the negative threshold b1 is used as a threshold necessary for shifting from a rapid pressure build-up mode or a moderate pressure build-up mode to a high-pressure hold mode, while the positive threshold a is used as a threshold necessary for shifting from a rapid pressure-reduction mode to a low-pressure hold mode. On the basis of the above-noted comparison results, the pressure control circuit 18 properly controls the wheel-cylinder pressure at the respective wheel-brake cylinder 2FL, 2FR, 2RL and 2RR, by selecting one of six pressure control modes, namely a rapid pressure build-up mode at which the wheel-cylinder pressure is rapidly increased, a high-pressure hold mode at which the wheel-cylinder pressure is held constant at a high-pressure level, a low-pressure hold mode at which the wheel-cylinder pressure is held constant at a low-pressure level, a moderate pressure reduction mode at which the wheel-cylinder pressure is moderately reduced, a rapid pressure reduction mode at which the wheel-cylinder pressure is rapidly reduced, and a moderate pressure build-up mode at which the wheel-cylinder pressure is moderately increased, and by adjusting the wheel-cylinder pressure in accordance with the selected mode. As appreciated from the above, the anti-skid control executed by the anti-skid control system of the present invention is directed essentially to an anti-skid brake control according to which the wheel-brake cylinder pressure can be properly controlled.

Figure 3:
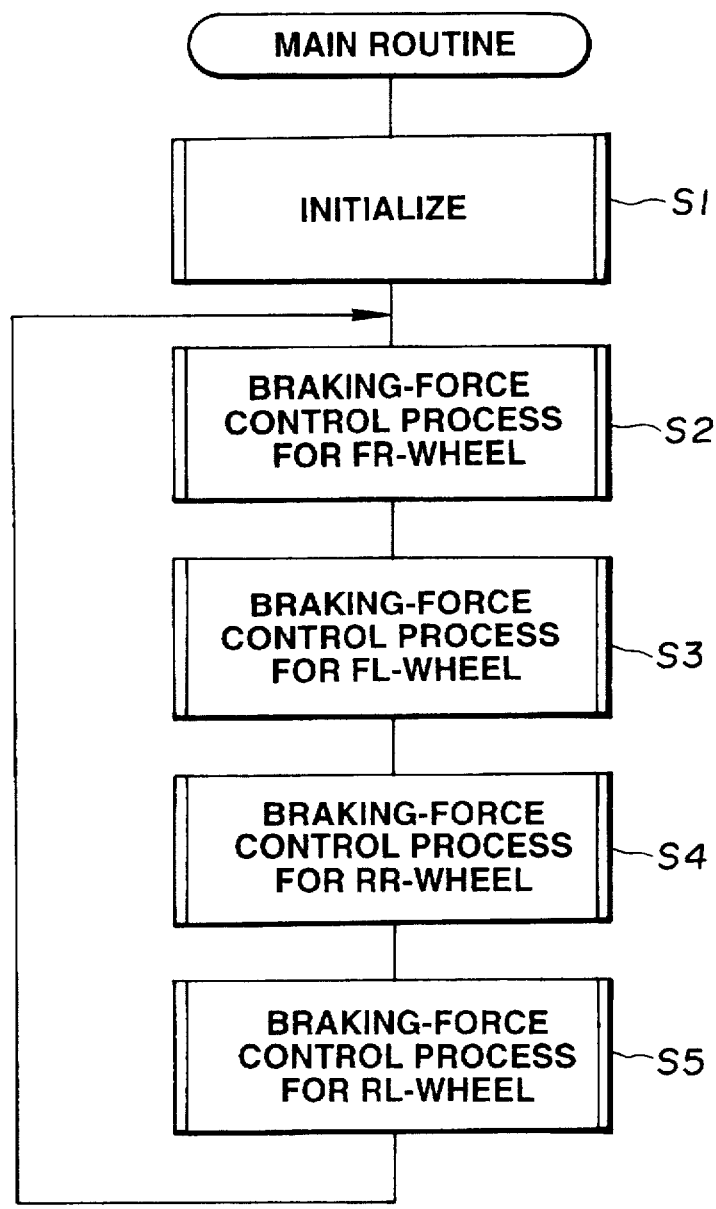
FIG. 3 is a flow chart illustrating a main routine of an anti-skid brake control executed by a wheel-brake cylinder pressure control circuit included in the anti-skid control system shown in FIG. 1.

As seen in FIG. 3, after initialization (See step S1), the arithmetic processor 25b of the microcomputer 25 executes repeatedly a braking-force control process (See step S2) corresponding to the ABS control for the actuator 6FR of the front-right road wheel 1FR, a braking-force control process (See step S3) for the actuator 6FL of the front-left road wheel 1FL, a braking-force control process (See step S4) for the actuator 6RR of the rear-right road wheel 1RR, a braking-force control process (See step S5) for the actuator 6RL of the rear-left road wheel 1RL, in that order. The main routine of FIG. 3 is executed as time-triggered interrupt routines to be triggered every predetermined time intervals.

Figure 4:
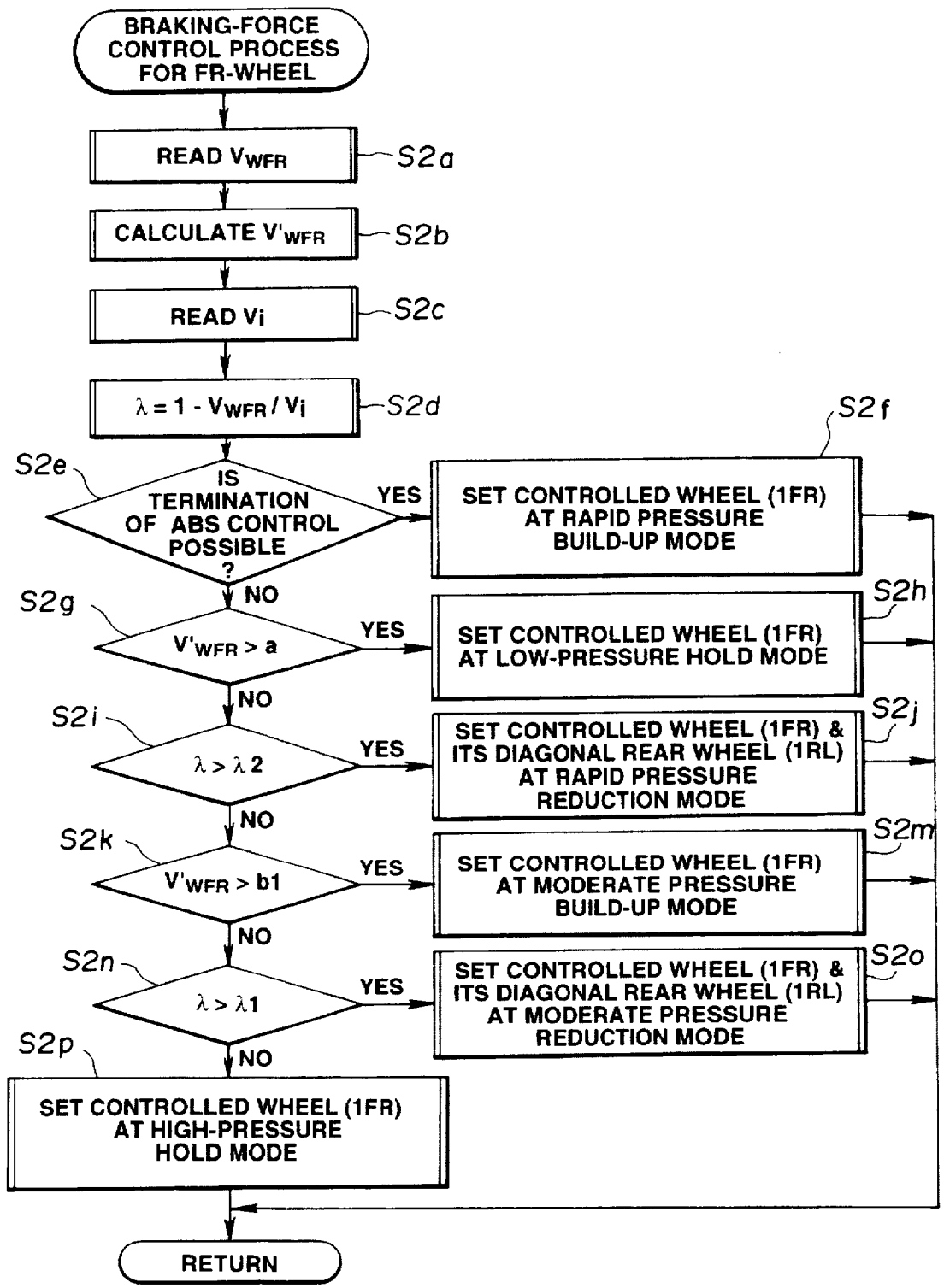
FIG. 4 is a flow chart illustrating a sub-routine of a wheel-cylinder pressure control process or a braking-force control process executed with respect to the front-right road wheel.

As can be appreciated from steps S2j and S2o illustrated in FIG. 4, the braking-force control process (See step S2 of FIG. 3) for the actuator 6FR of the front-right road wheel 1FR is characterized in that, when setting the front-right road wheel 1FR, subjected to the anti-skid brake control, at the rapid pressure-reduction mode (See step S2j) or at the moderate pressure-reduction mode (See step S2o), its diagonal rear wheel (1RL), which is located on the vehicle diagonally with respect to the controlled front-right road wheel 1FR is simultaneously set at the pressure reduction mode identical to the front-right road wheel 1FR. In the control procedure (the main routine) shown in FIG. 3, the road wheel assigned to the braking-force control process, currently executed, will be hereinafter referred to as a "controlled road wheel". Likewise, in the braking-force control process (See step S3 of FIG. 3) for the actuator 6FL of the front-left road wheel 1FL, when setting the front-left road wheel 1FL, subjected to the anti-skid brake control, at the rapid pressure-reduction mode or at the moderate pressure-reduction mode, its diagonal rear wheel (1RR) is simultaneously set at the pressure-reduction mode identical to the front-left road wheel 1FL. Since the sub-routine for the braking-force control for the front-right road wheel 1FR is similar to that for the front-left road wheel 1FL, the control procedure of the braking-force control process of the front wheel side will be hereinafter discussed in detail in accordance with the flow chart indicated in FIG. 4, only in case of the front-right road wheel 1FR.

In step S2a, read is the front-right wheel-speed indicative signal VwFR from the front-right wheel-speed arithmetic circuit 15FR.

In step S2b, the wheel acceleration/deceleration indicative signal value V'wFR of the front-right wheel 1FR is calculated.

In step S2c, the pseudo vehicle speed Vi is read.

In step S2d, the slip ratio λ of the front-right wheel 1FR is calculated as a function of the front-right wheel speed indicative signal value VwFR and the pseudo vehicle speed Vi, in accordance with the following expression (1).

$$\lambda = 1 - V_{WFR}/V_i \qquad (1)$$

In step S2e, a decision is made to determine whether the anti-skid control can be terminated or not. For example, the control circuit decides that the anti-skid control does not yet terminate under a particular condition in which the wheel acceleration/deceleration indicative signal value V'wFR is below the predetermined negative threshold b1 with a brake switch (not shown) switched ON, and the estimated pseudo vehicle speed Vi exceeds a predetermined low speed nearly equal to zero at the beginning of the anti-skid control, and additionally the frequency of the moderate pressure build-up mode is less than a predetermined value. The answer to step S2e is affirmative (YES), i.e., in case that termination of the anti-skid control (the ABS control) is possible, step S2f proceeds in which the actuator 6FR of the controlled front-right road wheel 1FR, subjected to the ABS control, is set at the rapid pressure build-up mode in which the control signals EV and AV output to the actuator 6FR are both set at a logical value "0", and thus the inflow valve 8 is maintained in its fully-open state and the outflow valve 9 is maintained in its fully-closed state. Conversely, when the answer to step S2e is negative (NO), step S2g proceeds in which a test is made to determine whether or not the wheel acceleration/deceleration indicative signal value V'wFR exceeds the predetermined positive threshold (corresponding to an acceleration threshold) a. In case of V'wFR>a, step S2h proceeds in which the actuator 6FR of the controlled front-right road wheel 1FR is set at the low-pressure hold mode in which the control signal EV output to the actuator 6FR is set at the logical value "1" and the control signal AV output to the actuator 6FR is set at the logical value "0", and thus the inflow and outflow valves 8 and 9 of the actuator 6FR are both maintained in their fully-closed state to hold the internal pressure in the wheel-brake cylinder 2FR constant. On the other hand, in case of V'wFR≦a, step S2i proceeds in which a test is made to determine whether or not the slip ratio λ of the front-right wheel 1FR is greater than the second reference slip ratio λ2. When the answer to step S2i is affirmative (YES), i.e., in case of λ>λ2, the controller decides that there is a tendency for the front-right wheel 1FR to lock, step S2j proceeds in which the actuator 6FR of the controlled front-right wheel 1FR and the actuator 6RL of its diagonal rear wheel 1RL are set at the rapid pressure-reduction mode in which the control signals EV and AV output to each of the actuators 6FR and 6RL are both set at the logical value "1", and thus the inflow valve 8 of each actuator 6FR and 6RL is maintained in the fully-closed state and the outflow valve 9 of each actuator 6FR and 6RL is shifted to the fully-open state, with the result that the brake-fluid in each of the wheel-brake cylinders 2FR and 2RL is quickly returned from the outflow valve 9 through the pump 10 and the check valve 11 to the master cylinder 5 and thus the internal pressure in each of the wheel-brake cylinders 2FR and 2RL is reduced rapidly.

When the answer to step S2i is negative (NO), i.e., in case of λ≦λ2, step S2k proceeds in which a test is made to determine whether or not the wheel acceleration/deceleration indicative signal value V'wFR exceeds the predetermined negative threshold (corresponding to a deceleration threshold) b1. In case of V'wFR>b1, step S2m proceeds in which the actuator 6FR of the controlled front-right road wheel 1FR is set at the moderate pressure build-up mode in which the control signal EV output to the actuator 6FR is alternately and periodically set at the logical values "1" and "0" and the control signal AV output to the actuator 6FR is set at the logical value "0", and thus the inflow valve 8 of the actuator 6FR is repeatedly opened and closed at predetermined time intervals and the outflow valve 9 of the actuator 6FR is maintained in the fully-closed state, with the result that the internal pressure in the wheel-brake cylinder 2FR is moderately built up in a stepwise manner. In contrast, when the answer to step S2k is negative (NO), i.e., in case of V'wFR≦b1, step S2n proceeds in which a test is made to determine whether or not the slip ratio λ of the front-right wheel 1FR is greater than the first reference slip ratio λ1 (the target slip ratio). When the answer to step S2n is affirmative (YES), i.e., in case of λ>λ1, step S2o proceeds in which the actuator 6FR of the controlled front-right wheel 1FR and the actuator 6RL of its diagonal rear wheel 1RL are set at the moderate pressure-reduction mode in which the control signal EV output to each of the actuators 6FR and 6RL is set at the logical value "1" and the control signal AV output to each of the actuators 6FR and 6RL is alternately and periodically set at the logical values "1" and "0" and thus the inflow valve 8 of each of the actuators 6FR and 6RL is maintained in the fully-closed state and the outflow valve 9 of each of the actuators 6FR and 6RL is repeatedly opened and closed at predetermined time intervals, with the result that the internal pressure in each of the wheel-brake cylinders 2FR and 2RL is moderately reduced in a stepwise manner. On the other hand, when the answer to step S2n is negative (NO), i.e., in case of λ≦λ1, step S2p proceeds in which the actuator 6FR of the controlled front-right wheel 1FR is set at the high-pressure hold mode in which, in the same manner as the low-pressure hold mode of step S2h, the control signal EV output to the actuator 6FR is set at the logical value "1" and the control signal AV output to the actuator 6FR is set at the logical value "0", and thus the inflow and outflow valves 8 and 9 of the actuator 6FR are both maintained in their fully-closed state to hold the internal pressure in the wheel-brake cylinder 2FR constant. After each of steps S2f, S2h, S2j, S2m, S2o and S2p, the sub-routine shown in FIG. 4 terminates and then the control procedure returns to the main routine shown in FIG. 3.

Returning to FIG. 5, there is shown the braking-force control process (See step 4 of FIG. 3) for the rear-right road wheel 1RR. Since the sub-routine for the braking-force control for the rear-right road wheel 1RR is similar to the sub-routine (See step 5 of FIG. 3) for the rear-left road wheel 1RL, the control procedure of the braking-force control process of the rear wheel side will be hereinafter explained briefly in accordance with the flow chart indicated in FIG. 5, only in case of the rear-right road wheel 1RR.

In step S4a, read is the rear-right wheel-speed indicative signal VwRR from the rear-right wheel-speed arithmetic circuit 15RR.

In step S4b, the wheel acceleration/deceleration indicative signal value V'wRR of the rear-right wheel 1RR is calculated.

In step S4c, the pseudo vehicle speed Vi is read.

In step S4d, the slip ratio λ of the rear-right wheel 1RR is calculated as a function of the rear-right wheel speed indicative signal value VwRR and the pseudo vehicle speed Vi, in accordance with the following expression λ=1−VwRR/Vi.

Figure 5:
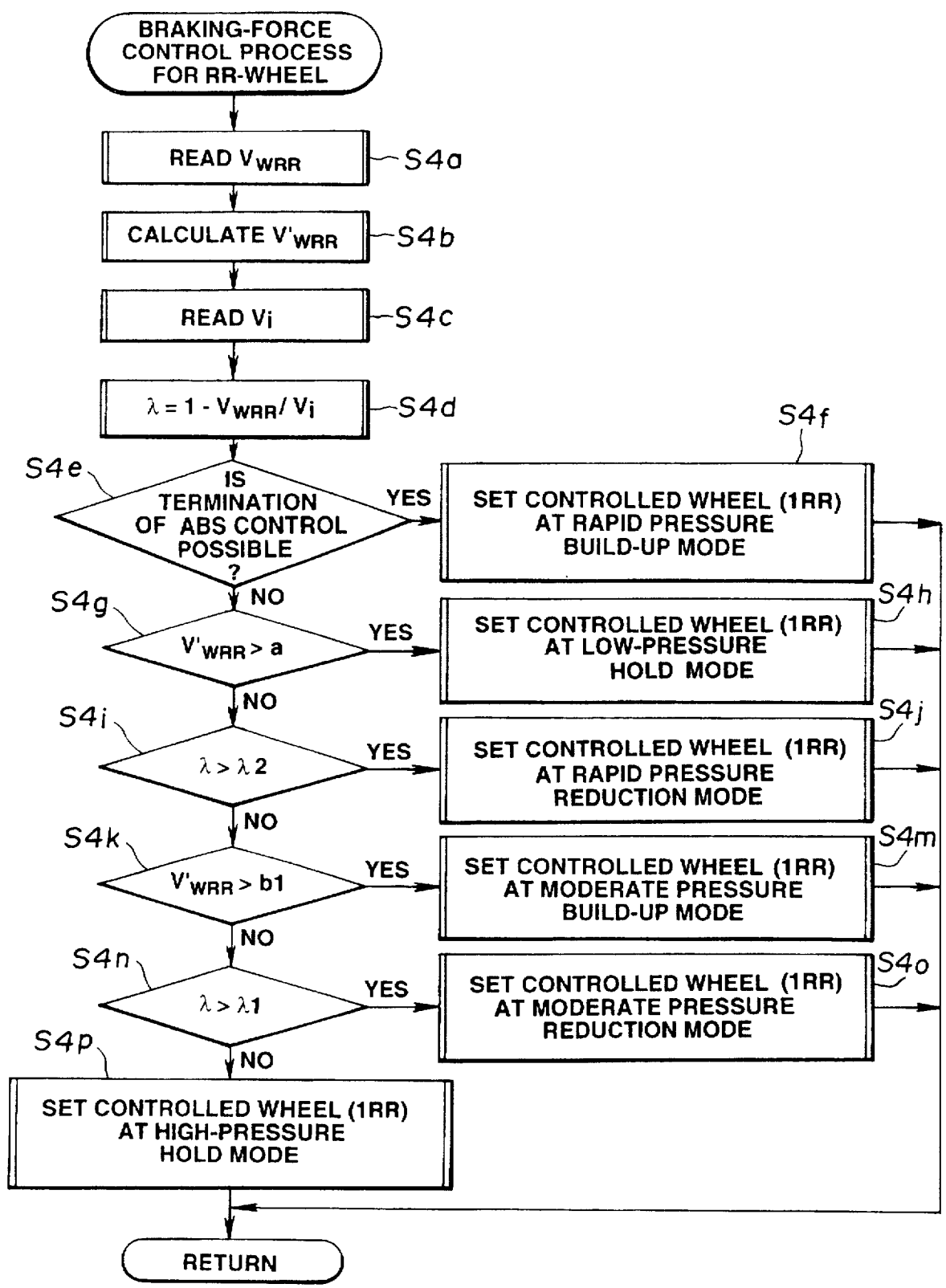
FIG. 5 is a flow chart illustrating a sub-routine of the braking-force control process executed with respect to the rear-right road wheel.

Since decision diamonds shown in steps S4e, S4g, S4i, S4k and S4n of FIG. 5 are essentially identical to the respective decision diamonds shown in steps S2e, S2g, S2i, S2k and S2n of FIG. 4, except that the suffix WRR of the wheel acceleration/deceleration indicative signal value V'WRR is different from the suffix WFR of the wheel acceleration/deceleration indicative signal value V'WFR. As may be appreciated from steps S4f, S4h, S4j, S4m, S4o and S4p, the braking-force control process for the rear-right road wheel 1RR is remarkably different from that for the front-right road wheel 1FR, in that only the controlled rear-right road wheel 1RR, subjected to the ABS control, is independently operated, in the same manner as the conventional ABS control, at six wheel-brake cylinder pressure control modes, namely the rapid pressure build-up mode (See step S4f), the low-pressure hold mode (See step S4h), the rapid pressure-reduction mode (See step S4j), the moderate pressure build-up mode (See step S4m), the moderate pressure-reduction mode (See step S4o) and the high-pressure hold mode (See step S4p).

The system made according to the present invention operates as follows.

Figure 6:
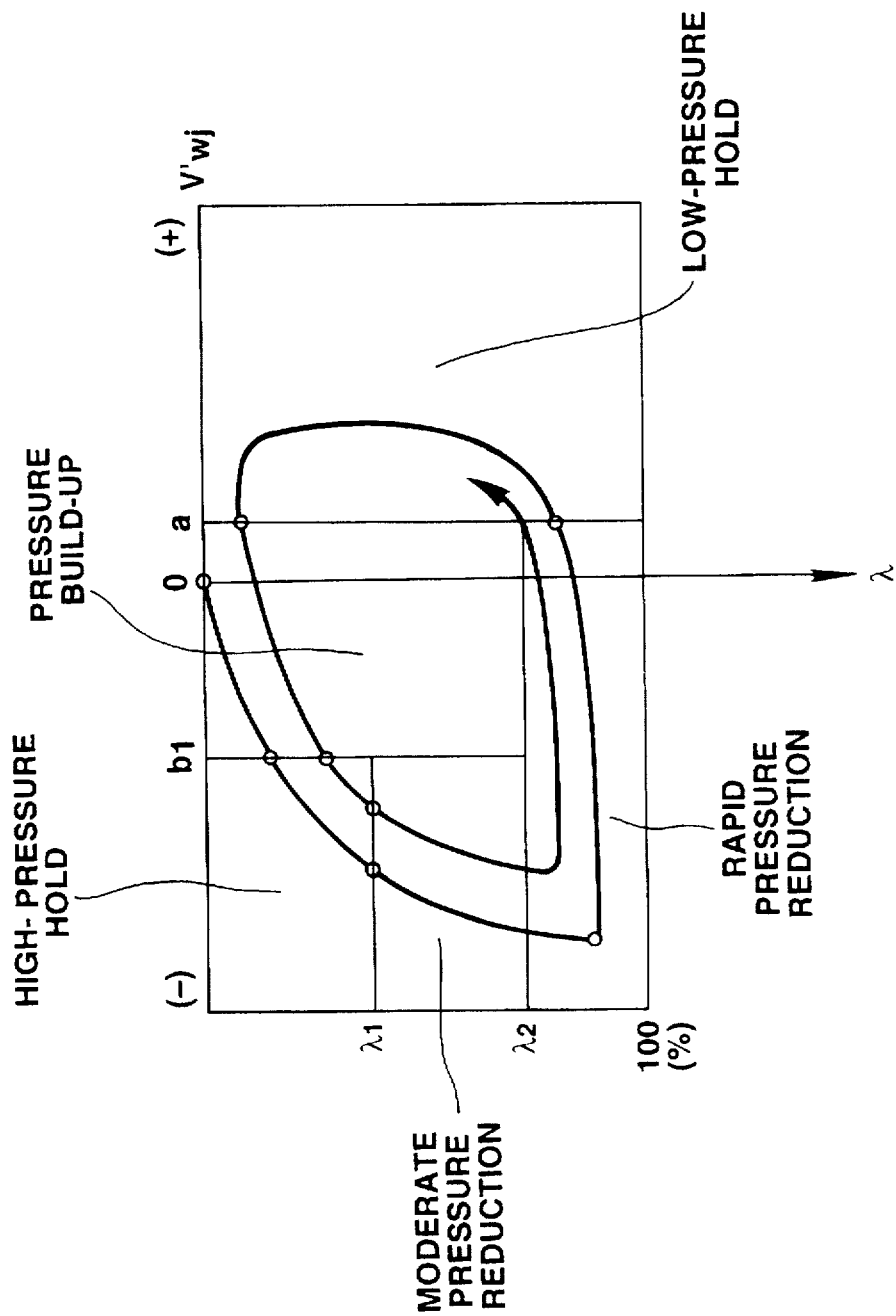
FIG. 6 is an explanatory view illustrating a control pattern of the wheel-cylinder pressure control executed by the wheel-brake cylinder pressure control circuit shown in FIG. 1.

On the assumption that the vehicle is traveling at a constant speed on high-µ roads, such as dry pavements, and thus the brakes are not applied, when the main routine shown in FIG. 3 begins, the control procedure flows from step S2e to step S2f in the sub-routine shown in FIG. 4 and also flows from step S4e to step S4f in the sub-routine shown in FIG. 5, since the necessary condition for termination of the ABS control is satisfied. As a result, the respective actuators 6FR, 6FL, 6RR and 6RL of the front-right road wheel 1FR, the front-left road wheel 1FL, the rear-right road wheel 1RR and the rear-left road wheel 1RL are all set at the rapid pressure build-up mode. In this case, with the brakes released, the master-cylinder pressure is essentially zero, and thus the internal pressure in each wheel-brake cylinder is maintained at zero, with the result that non-braking condition is continued. Thereafter, when shifting from the constant-speed driving state on the high-µ road to the braking state, the brake-fluid pressure in each of the wheel-brake cylinders 2FR, 2FL, 2RR and 2RL rapidly increases owing to a pressure-rise in the master-cylinder pressure to produce a great braking force. When the brakes are applied during the straight-ahead driving on high-µ roads, each of the wheel-speed indicative signal values VWFL, VWFR, VWRL and VWRR is gradually decreased due to great traction between each road wheel and the road surface of a high friction coefficient. As seen in the characteristic curve of the ABS control shown in FIG. 6, the respective acceleration/ deceleration indicative signal values V'WFL, V'WFR, V'WRL and V'WRR vary in the negative direction indicated by (−) and corresponding to a direction of increase in deceleration. Since the necessary condition for initiation of the ABS control is satisfied when each acceleration/deceleration indicative signal value V'wj (j=FL, FR, RL, RR) becomes less than or equal to the predetermined negative threshold b1, the anti-skid control (ABS control) initiates. Upon initiation of the ABS control, the procedure shifts from step S2e to step S2g in the sub-routine of FIG. 4 and also shifts from step S4e to step S4g in the sub-routine of FIG. 5. At this time, since the slip ratio λ of each road wheel is below the first reference slip ratio µ1 (the target slip ratio), the actuators 1FL, 1FR, 1RL and 1RR of the respective road wheels are set at the high-pressure hold mode (See the flow from step S2g through steps S2i, S2k and S2n to step S2p and the flow from step S4g through steps S4i, S4k and S4n to step S4p). With the four actuators held at the high-pressure hold mode, since application of the braking force onto each road wheel is still continued, the respective wheel acceleration/ deceleration indicative signal values V'wj further increase and thus the slip ratio λ of each road wheel also increases. Thereafter, assuming that the slip ratio λ exceeds the target slip ratio λ1 and also the respective wheel acceleration/ deceleration indicative signal values V'wj remain below the predetermined negative threshold b1, in the front-wheel side, the actuators 6FL and 6FR of the controlled front-left road wheel 1FL and the controlled front-right road wheel 1FR and the actuators 6RR and 6RL of their diagonal rear wheels 1RR and 1RL are all set at the moderate pressure-reduction mode (See the flow from step S2g through steps S2i, S2k and S2n to step S2o), while in the rear-wheel side the actuators 6RL and 6RR of the controlled rear-left road wheel 1RL and the controlled rear-right road wheel 1RR are set at the moderate pressure-reduction mode (See the flow from step S4g through steps S4i, S4k and S4n to step S4o). In such a moderate pressure-reduction mode, the braking forces applied to the respective road wheels are gradually released, while the wheel speed indicative signal values Vwj (j=FL, FR, RL, RR) decrease for a while. Assuming that the slip ratio λ exceeds the second reference slip ratio λ2 owing to a further decrease in the wheel acceleration/deceleration indicative signal value V'wj, in the front-wheel side, the actuators 6FL and 6FR of the controlled front-left road wheel 1FL and the controlled front-right road wheel 1FR and the actuators 6RR and 6RL of their diagonal rear wheels 1RR and 1RL are all set at the rapid pressure-reduction mode (See the flow from step S2g through step S2i to step S2j), while in the rear-wheel side the actuators 6RL and 6RR of the controlled rear-left road wheel 1RL and the controlled rear-right road wheel 1RR are set at the rapid pressure-reduction mode (See the flow from step S4g through step S4i to step S4j). Under these conditions, the respective wheel acceleration/deceleration indicative signal values V'wj may vary in the positive direction indicated by (+) and corresponding to a direction of increase in acceleration. Thereafter, when each wheel acceleration-deceleration indicative signal value V'wj exceeds the predetermined positive threshold a, the actuator of the controlled road wheel is set at the low-pressure hold mode (See the flow from step S2g to step S2h and the flow from step S4g to step S4h). With each actuator 6j (j=FL, FR, RL, RR) held at the low-pressure hold mode, the brake-fluid pressure in the wheel-brake cylinder 2j (j=FL, FR, RL, RR) is maintained at a substantially constant low-pressure level, and thus the wheel-speed indicative signal values Vwj tend to increase, with the result that the wheel acceleration/deceleration indicative signal values V'wj continue to increase in the positive direction, thereby resulting in decrease in the slip ratio λ of each road wheel. However, in the low-pressure hold mode, since the braking forces of a comparatively small magnitude are applied to the respective road wheels, the wheel speed indicative signal values Vwj decrease after their increasing motions. Thereafter, as soon as the wheel acceleration/deceleration indicative signal value V'wj becomes below the predetermined positive threshold a, the actuators of the controlled road wheels 1j (j=FL, FR, RL, RR) are set at the moderate pressure build-up mode. In the moderate pressure build-up mode, since the wheel-brake cylinder pressure is moderately increased, the braking force applied to the respective road wheel is gradually increased, and thus the respective road wheel is maintained at the deceleration state. As a result, the wheel speed indicative signal values Vwj decrease moderately, while the slip ratio λ of each road wheel increases moderately. Thereafter, when the wheel acceleration/deceleration indicative signal value V'wj is below the predetermined negative threshold b1, the actuator of the controlled road wheel is set at the high-pressure hold mode. When the slip ratio λ of the controlled road wheel exceeds the first reference slip ratio λ1, the control mode is shifted from the high-pressure hold mode to the moderate pressure-reduction mode. Thereafter, as may be appreciated from the characteristic curve shown in FIG. 6, the control mode is shifted from the rapid pressure-reduction mode through the low-pressure hold mode, the moderate pressure build-up mode, and the high-pressure hold mode to the moderate pressure-reduction mode, in that order. In this manner, the system of the first embodiment ensures an anti-skid effect. Although the characteristic curve varies via both the moderate pressure-reduction mode and the rapid pressure-reduction mode, actually, the high-pressure hold mode, the moderate pressure-reduction mode, the moderate pressure build-up mode, the low-pressure hold mode and the moderate pressure build-up mode may be repeatedly executed without passing through the rapid pressure-reduction mode, during braking on dry pavements.

In the event that the brakes are applied quickly during straight-ahead driving on low-μ roads, such as wet, icy or snow roads, the brake-fluid pressure in the respective wheel-brake cylinder 2j increases rapidly owing to a steep pressure-rise in the master-cylinder pressure, thereby resulting in a rapid decrease in the wheel speed indicative signal values Vwj. This results in a rapid increase in the slip ratio λ of each road wheel. As soon as the slip ratio λ of the controlled road wheel exceeds the second reference slip ratio λ2, in the front-wheel side the controlled front road wheel and its diagonal rear road wheel are both set at the rapid pressure-reduction mode (See the flow from step S2i to step S2j), while in the rear-wheel side only the controlled rear road wheel is set at the rapid pressure-reduction mode (See the flow from step S4i to step S4j). Thus, the respective brake-fluid pressures in all of the wheel-brake cylinders 2j (FL, FR, RL, RR) are reduced quickly, thus preventing the road wheels 1j (FL, FR, RL, RR) from locking.

Suppose the vehicle is traveling on a so-called split-μ road, for example, the front-right road wheel 1FR and the rear-right road wheel 1RR are rotating on a low-μ road, whereas the front-left road wheel 1FL and the rear-left road wheel 1RL are rotating on a highs road. Under this condition, when the brakes are applied, there is a tendency for the wheel speed indicative signal values VwFR and VwRR of the right-hand side road wheels 1FR and 1RR rotating on the low-μ road to be remarkably reduced, as compared with those of left-hand side road wheels 1FL and 1RL rotating on the high-μ road. Thus, the wheel acceleration/deceleration indicative signal values V'wFR and V'wRR varies in the negative direction. Therefore, such a frequency that the actuators 6FR and 6RR of the right-hand side road wheels 1FR and 1RR are set from the rapid pressure build-up mode to the moderate pressure-reduction mode or to the rapid pressure-reduction mode through the high-pressure hold mode becomes greater in comparison with the actuators 6FL and 6RL of the left-hand side road wheels 1FL and 1RL. As regards a braking force applied to each road wheel, the braking forces respectively applied to the front-right road wheel 1FR and the rear-right road wheel 1RR become less than the braking force applied to the front-left road wheel 1FL, as explained in detail below.

In the braking-force control process at step S2 of FIG. 3, as seen in FIG. 4, when the actuator 6FR of the front-right road wheel 1FR is set at the moderate pressure-reduction mode or at the rapid pressure-reduction mode, the actuator 6RL of its diagonal rear road wheel (i.e., the rear-left road wheel 1RL) is set simultaneously at the moderate pressure-reduction mode or at the rapid pressure-reduction mode. Even though the rear-left road wheel 1RL is rotating on the high-μ road, the frequency of setting the control mode of the rear-left road wheel 1RL (rotating on the high-μ road) to the moderate pressure-reduction mode or to the rapid pressure-reduction mode becomes equivalent to the frequency of setting the control mode of the front-right road wheel 1FR (rotating on the low-μ road) to the moderate pressure-reduction mode or to the rapid pressure-reduction mode. On the other hand, only the frequency of setting the control mode of the front-left road wheel 1FL (rotating on the high-μ road) to the moderate pressure-reduction mode or to the rapid pressure-reduction mode is less in comparison with the other road wheels 1FR, 1RL and 1RR, whereas hitherto both the frequency of the control mode of the front-left road wheel 1FL (rotating on the high-μ road) to the pressure-reduction mode and the frequency of the control mode of the rear-left road wheel 1RL (rotating on the high-μ road) to the pressure-reduction mode are less in comparison with the right-hand side road wheels 1FR and 1RR both rotating on the low-μ road. As appreciated, with the rear-left road wheel 1RL controlled at the pressure reduction mode in synchronization with shifting of the control mode of the front-right road wheel 1FR to the moderate pressure-reduction mode or to the rapid pressure-reduction mode, the braking force applied to the rear-left road wheel 1RL can be properly reduced. The reduced braking force acting onto the rear-left road wheel 1RL is advantageous to produce an increased cornering force at the rear-left road wheel 1RL rotating on the high-μ road, which cornering force acts to suppress undesired development of yawing moment exerting on the vehicle. In the braking-force control process (See step S3 shown in FIG. 3) for the front-left road wheel 1FL, since the front-left road wheel 1FL has a comparatively less frequency of setting to the pressure reduction mode, such a frequency that the rear-right road wheel 1RR diagonal to the front-left road wheel 1FL is controlled at the pressure reduction mode in synchronization with shifting of the control mode of the front-left road wheel 1FL to the moderate pressure-reduction mode or to the rapid pressure-reduction mode, becomes less. However, by way of the individual braking-force control process (See step S4) for the rear-right road wheel 1RR, the frequency of setting the control mode of the rear-right road wheel 1RR (rotating on the low-μ road) to the moderate pressure-reduction mode or to the rapid pressure-reduction mode becomes almost equivalent to the frequency of setting the control mode of the front-right road wheel 1FR (rotating on the low-μ road) to the moderate pressure-reduction mode or to the rapid pressure-reduction mode. As a whole, the braking force applied to the right-hand side road wheels rotating on the low-μ road and the braking force applied to the rear-left road wheel 1RL diagonal to the front-right road wheel 1FR rotating on the low-μ road can be suppressed at a small value, as compared with the braking force applied to the front-left road wheel 1FL rotating on the high-μ road. As a result, even when the brakes are applied during the straight-ahead driving on the split-μ road, wheel-lock can be effectively suppressed or avoided and additionally undesired yawing moment exerted on the vehicle can be effectively suppressed because of the braking forces applied to the rear wheels are suppressed to almost the same small value. This assures a high driveability and a high running stability during straight-ahead driving on a split-μ road.

In contrast to the above, during straight-ahead driving on a split-μ road in which the right-hand side road wheels 1FR and 1RR are rotating on the high-μ road, whereas the left-hand side road wheels 1FL and 1RL are rotating on the low-μ road, a comparatively great braking force is applied only to the front-right road wheel 1FR, while the braking forces applied to the other road wheels 1FL, 1RL and 1RR are suppressed to a comparatively small value. For the reasons set forth above, undesired yawing moment exerted on the vehicle can be effectively reduced, thus enhancing the driveability of the vehicle.

In the event that the brakes are applied while turning to the left on the high-μ road, the wheel-load of the left-hand side road wheels 1FL and 1RL is shifted towards the right-hand side road wheels 1FR and 1RR. During a left turn, the greater the lateral acceleration exerted on the vehicle, the greater the wheel-load of the right-hand side road wheels and the smaller the wheel-load of the left-hand side road wheels. Additionally, during braking, the entire weight of the vehicle is thrown into the front, and thus the wheel-load of the rear road wheels 1RL and 1RR is shifted toward the front road wheels 1RL and 1RR. Suppose the wheel-brake cylinder pressures of the respective road wheels are identical to each other, and thus the braking forces applied to the respective road wheels are identical to each other. In this case, the magnitude relationship of wheel-load between the four road wheels 1FL to 1RR may be indicated by the inequality of (the wheel-load of the front-right road wheel 1FR corresponding to the front-outer wheel turning) >(the wheel-load of the front-left road wheel 1FL corresponding to the front-inner wheel turning)>(the wheel-load of the rear-right road wheel 1RR corresponding to the rear-outer wheel turning)>(the wheel-load of the rear-left road wheel 1RL corresponding to the rear-inner wheel turning). The lighter the wheel load, the smaller the friction force between the road surface and the tire. Thus, when the brakes are applied, a remarkable reduction of the wheel speed occurs firstly at the road wheel 1RL of the lightest wheel load. Under these conditions, suppose the braking-force control processes are executed from step S2 through steps S3 and S4 to step S5, in that order. In the braking-force control process for the front-right road wheel 1FR, executed at step S2, since the front-right road wheel 1FR has the heaviest wheel load, the wheel speed indicative signal value VWFR may decrease slowly. Thus, at the beginning of the braking action, the actuator 6FR of the front-right road wheel 1FR is shifted from the rapid pressure build-up mode to the pressure hold mode at the slowest timing, as compared with the other road wheels, and thus the brake-fluid pressure in the front-right wheel-brake cylinder 2FR will rise up to the highest pressure level to assure a greatest braking force applied to the front-right road wheel 1FR. Thereafter, when the control mode of the front-right road wheel 1FR is set via the high-pressure hold mode to the moderate pressure-reduction mode or to the rapid pressure-reduction mode, the wheel speed VWFR may be recovered at the fastest timing owing to the greatest friction force resulting from the heaviest wheel load of the front-right road wheel 1FR. A time interval in which the front-right road wheel 1FR is controlled at the pressure-reduction mode is shorter, as compared with the other road wheels. In synchronization with shifting of the control mode of the front-right road wheel 1FR to the moderate pressure-reduction mode or to the rapid pressure-reduction mode, the rear-left road wheel 1RL is also controlled at the moderate pressure-reduction mode or at the rapid pressure-reduction mode. The frequency of setting the control mode of the rear-left road wheel 1RL to the pressure-reduction mode, based on the braking-force control process for the front-right road wheel 1FR, is less. On the other hand, in the braking-force control process for the rear-left road wheel 1RL, executed at step S5, since the rear-left road wheel 1RL has the lightest wheel load and thus the greatest increased tendency of wheel-lock, the control mode of the rear-left road wheel 1RL will frequently repeat from the high-pressure hold mode through the rapid pressure-reduction mode and the low-pressure hold mode to the moderate pressure build-up mode or from the high-pressure hold mode through the moderate pressure-reduction mode, the moderate pressure build-up mode and the low-pressure hold mode to the moderate pressure build-up mode. As a whole, the frequency of setting the control mode of the rear-left road wheel 1RL to the pressure reduction mode becomes greater.

In the braking-force control process for the front-left road wheel 1FL of the second heaviest wheel load, executed at step S3, the control mode of the rear-right road wheel 1RR is controlled at the pressure-reduction mode in synchronization with shifting of the control mode of the front-left road wheel 1FL to the moderate pressure-reduction mode or to the rapid pressure-reduction mode. Since there is less wheel-load difference between the front-left road wheel 1FL of the second heaviest wheel load and the rear-right road wheel 1RR of the second lightest wheel load, the frequency of setting the control mode of the rear-right road wheel 1RR of the second lightest wheel load to the pressure-reduction mode becomes less than that of the rear-left road wheel 1RL of the lightest wheel load, and almost equivalent to that of the front-left road wheel 1FL of the second heaviest wheel load. Thus, the braking force applied to the rear-right road wheel 1RR becomes greater than the braking force applied to the rear-left road wheel 1RL and essentially equal to the braking force applied to the front-left road wheel 1FL, whereas hitherto the braking force applied to the rear-right road wheel 1RR is set at a small value identical to the braking force applied to the rear-left road wheel 1RL according to the previously-explained select-LOW method. It will be appreciated from the above, the system of the first embodiment can avoid lack of the braking force applied to the rear-outer road wheel turning during braking on turns, and the entire braking force of the vehicle is increased, and thus the braking distance can be effectively reduced.

Second Embodiment

Figure 7:
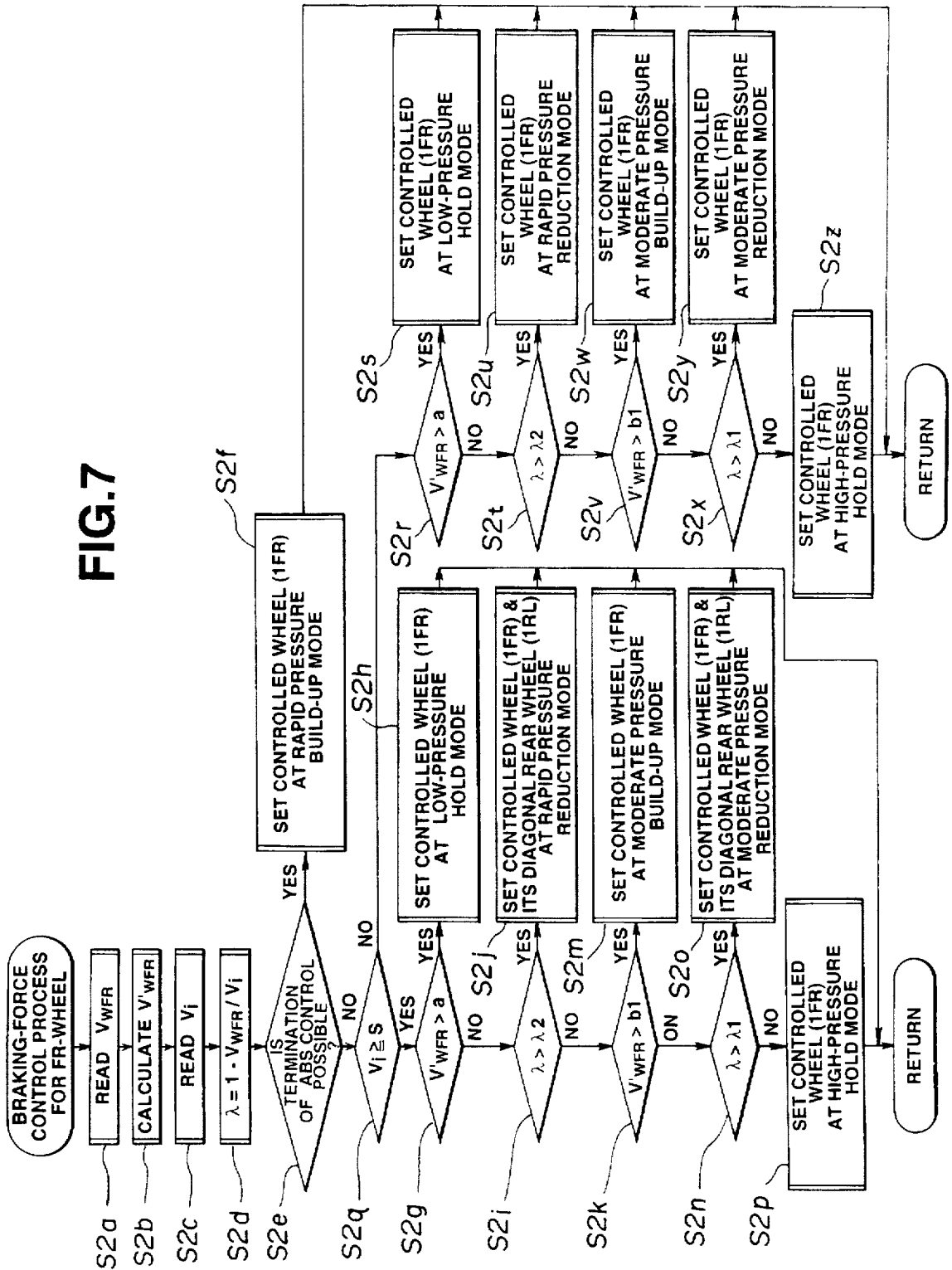
FIG. 7 is a flow chart illustrating a flow chart illustrating a sub-routine of the braking-force control process of the system of the second embodiment, executed with respect to the front-right road wheel.
Figure 8:
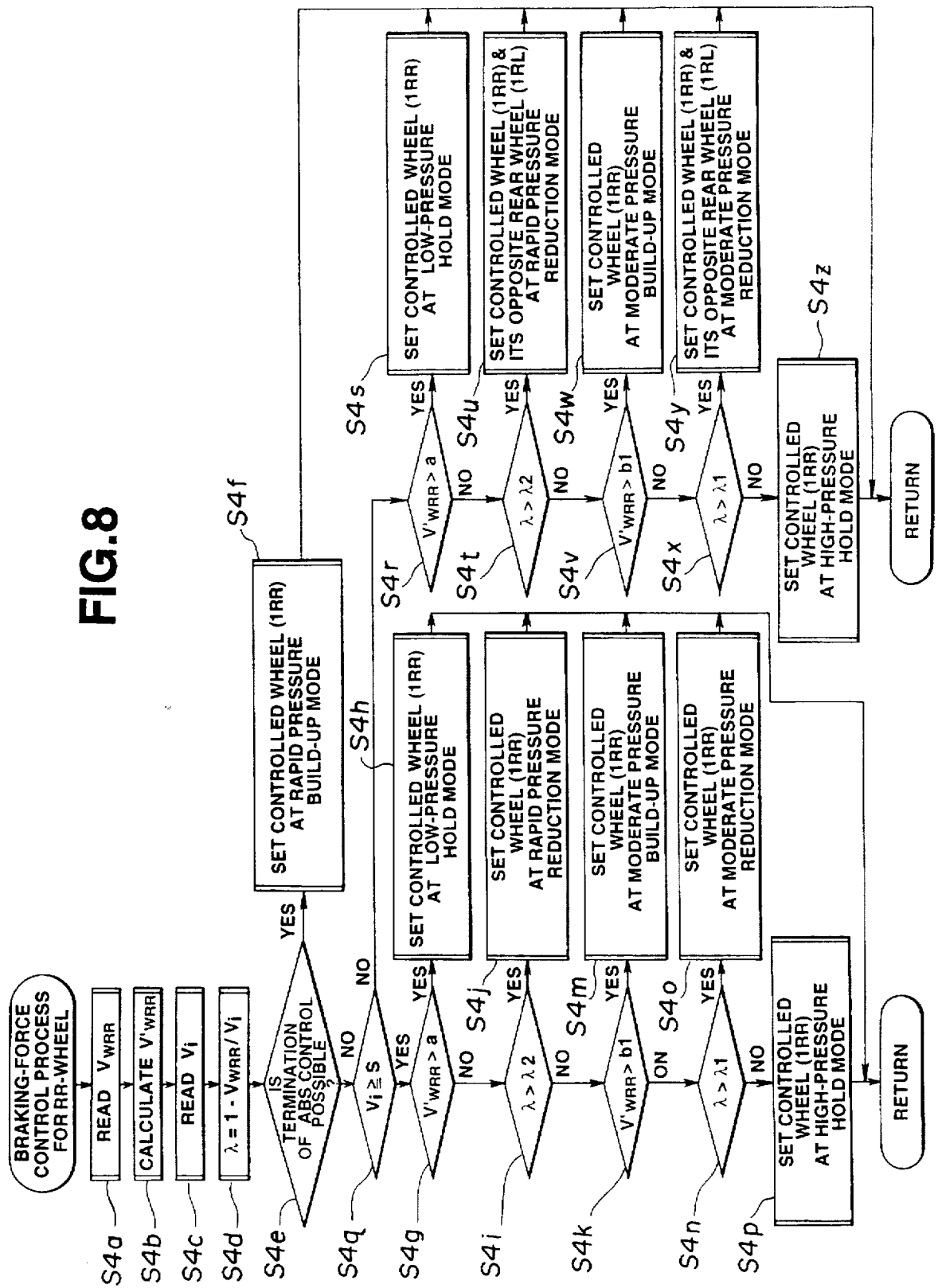
FIG. 8 is a flow chart illustrating a flow chart illustrating a sub-routine of the braking-force control process of the system of the second embodiment, executed with respect to the rear-right road wheel.

Referring now to FIGS. 7 and 8, there are shown the sub-routines of the braking-force control process of the anti-skid control system of the second embodiment. The sub-routine shown in FIG. 7 is similar to that of the sub-routine shown in FIG. 4, while the sub-routine shown in FIG. 8 is similar to the sub-routine shown in FIG. 5. Therefore, the same step numbers used in the system of the first embodiment of FIGS. 4 and 5 will be applied to the corresponding step numbers used in the system of the second embodiment of FIGS. 7 and 8, for the purpose of comparison between the first and second embodiments. The second embodiment is different from the first embodiment in that the system of the second embodiment can execute a second group of control modes indicated by steps S2s, S2u, S2w, S2y and S2z as well as a first group of control modes indicated by steps S2h, S2j, S2m, S2o and S2p in case of the front-wheel side and execute a second group of control modes indicated by steps S4s, S4u, S4w, S4y and S4z as well as a first group of control modes indicated by steps S4h, S4j, S4m, S4o and S4p in case of the rear-wheel side, depending on whether or not the running condition of the vehicle is a particular condition in which a great wheel-load difference between inner and outer road wheels occurs during braking on turns, for example depending on the magnitude of the pseudo vehicle speed Vi.

As seen in FIG. 7, note that in the braking-force control process for the front-right road wheel 1FR in the system of the second embodiment, step S2q is newly provided between steps S2e and S2g. In step S2q, a test is made to determine whether or not the pseudo vehicle speed Vi is greater than or equal to a preset vehicle speed S. In case of Vi≧S, the controller decides that such a running condition satisfies the above-noted particular condition. In this case, the procedure flows from step S2q to step S2g, and thus the controller sets the control mode of the front-right road wheel 1FR in the same manner as indicated in FIG. 4. On the other hand, in case of Vi<S, the controller decides that there is less wheel-load difference between inner and outer road wheels during braking on turns. Then, the procedure flows from step S2q to step S2r. As clearly seen in FIG. 7, steps S2r, S2t, S2v and S2x are identical respectively to steps S2g, S2i, S2k and S2n. Also, steps S2s, S2w and S2z included in the second control-mode group are identical respectively to steps S2h, S2m and S2p included in the first control-mode group. Note that steps S2u and S2y included in the second control-mode group are different from steps S2j and S2o included in the first control-mode group, respectively. Under the particular condition of Vi<S, in the braking-force control process of the front-right road wheel 1FR in the system of the second embodiment, only the actuator 6FR of the controlled front-right road wheel 1FR can be set at the rapid pressure-reduction mode at step S2u or set at the moderate pressure-reduction mode at step S2y.

Similarly to FIG. 7, referring now to FIG. 8, note that in the braking-force control process for the rear-right road wheel 1RR in the system of the second embodiment, step S4q is newly provided between steps S4e and S4g. In step S4q, a test is made to determine whether or not the pseudo vehicle speed Vi is greater than or equal to the preset vehicle speed S. In case of Vi>S, the controller decides that such a running condition satisfies the above-noted particular condition. In this case, the procedure flows from step S4q to step S4g, and thus the controller sets the control mode of the rear-right road wheel 1RR in the same manner as indicated in FIG. 5. On the other hand, in case of Vi<S, the controller decides that there is less wheel-load difference between inner and outer road wheels during braking on turns. Then, the procedure flows from step S4q to step S4r. As clearly seen in FIG. 8, steps S4r, S4t, S4v and S4x are identical respectively to steps S4g, S4i, S4k and S4n, while steps S4s, S4w and S4z included in the second control-mode group are identical respectively to steps S4h, S4m and S4p included in the first control-mode group. Note that steps S4u and S4y included in the second control-mode group are different from steps S4j and S4o included in the first control-mode group, respectively. Under the particular condition of Vi<S, in the braking-force control process of the rear-right road wheel 1RR in the system of the second embodiment, both the actuator 6RR of the controlled rear-right road wheel 1RR and the actuator 6RL of its opposite rear road wheel 1RL can be set at the rapid pressure-reduction mode at step S4u or set at the moderate pressure-reduction mode at step S4y. As may be appreciated, the second control-mode group (S4s, S4u, S4w, S4y, S4z) corresponds essentially to the control-mode group based on the previously-explained conventional select-LOW method. In the event that the vehicle is traveling at a low speed below the preset speed S, and thus there may be less wheel-load difference between inner and outer road wheels on turns, in the front-wheel side the actuator 6FR of the front-right road wheel 1FR and the actuator 6FL of the front-left road wheel 1FL are controlled independently of each other according to the braking-force control processes of steps S2 and S3, respectively. On the other hand, in the rear-wheel side, only when setting the rapid pressure-reduction mode at step S4u or the moderate pressure-reduction mode at step S4y, the actuators 6RR and 6RL of the controlled rear road wheel and its opposite rear road wheel are simultaneously set in common with each other at the rapid pressure-reduction mode or the moderate pressure-reduction mode. Owing to such a pressure-reduction control common to the rear-right and rear-left road wheels 1RR and 1RL, the system of the second embodiment can effectively suppress yawing moment exerted on the vehicle particularly during a low-speed driving on a split-μ road. This enhances a driving stability. When the brakes are applied during turning at a low speed, there is less wheel-load difference between inner and outer road wheels, and thus there will be scarcely lack of the braking force applied to the rear-outer road wheel, even when the rear-right and rear-left road wheels 1RR and 1RL are adjusted to the same braking force.

In contrast to the above, in case that the vehicle is traveling at a medium or high speed greater than the preset speed S, since the vehicle experiences a greater wheel-load difference between inner and outer road wheels during braking on turns, when setting the control mode of a certain front-wheel at the rapid pressure-reduction mode or at the moderate pressure-reduction mode, the actuator of its diagonal rear road wheel is also set at the identical pressure-reduction mode, in the same manner as the first embodiment. Thus, when the brakes are applied during turning at a medium or high speed, the braking force applied to the rear-outer road wheel turning is effectively increased to almost the same degree as the braking force applied to the front-inner road wheel turning. Thus, the system of the second embodiment can provide the same effects as the first embodiment.

Modification

In the first and second embodiments, when setting the actuator 6FL (6FR) of the controlled front road wheel 1FL (1FR) at the rapid pressure-reduction mode or at the moderate pressure-reduction mode, the actuator 6RR (6RL) of its diagonal rear road wheel 1RR (1RL) is simultaneously set at the rapid pressure-reduction mode or at the moderate pressure-reduction mode. To provide the same effects as the first and second embodiments, the select-LOW process may be made between the controlled rear-right road wheel 1RR and its diagonal front road wheel 1FL during the braking-force control process for the rear-right road wheel 1RR, while the select-LOW process may be made between the controlled rear-left road wheel 1RL and its diagonal front road wheel 1FR during the braking-force control process for the rear-left road wheel 1RL. For example, when the control routine shown in FIG. 3 is executed during traveling on a split-μ road in which right road wheels are rotating on a high-μ road and left road wheels are rotating on a low-μ road, the braking force applied to the front-right road wheel 1FR rotating on the high-μ road becomes greatest, the braking force applied to each of the left road wheels 1FL and 1RL both rotating on the low-μ road becomes smaller. On the other hand, the braking force applied to the rear-right road wheel 1RR rotating on the high-μ road becomes equivalent to the braking force applied to its diagonal front road wheel 1FL by way of the select-LOW process. Thus, such effectively suppressed braking forces applied to the rear-left and rear-right road wheels can prevent yawing moment exerted on the vehicle from developing. During braking on a left turn, as previously discussed, assuming that the front-right road wheel 1FR experiences the heaviest wheel load, the front-left road wheel 1FL experiences the second heaviest wheel load, the rear-right road wheel 1RR experiences the second lightest wheel load and the rear-left road wheel 1RL experiences the lightest wheel load, the braking force applied to the front-right road wheel 1FR becomes greatest, whereas the braking force applied to the rear-left road wheel 1RL becomes smallest through the select-LOW process. On the other hand, the respective braking forces applied to the front-left road wheel 1FL and the rear-right road wheel 1RR may be set at almost the same middle level. Therefore the modification can provide the same effects as the shown embodiments.

Although the system of the second embodiment determines on the basis of the magnitude of the pseudo vehicle speed Vi as to whether a great wheel-load difference between inner and outer road wheels will occur during braking on turns, the magnitude of the wheel-load difference may be estimated by a wheel-speed difference between left and right roads wheels. Alternatively, on the basis of the fact that the rear-inner wheel (of the lightest wheel load) tends to firstly lock during braking on turns, the magnitude of the wheel-load difference may be estimated by monitoring the order of initiation of the anti-skid brake control executed with respect to each road wheel. Also, the magnitude of the wheel-load difference may be estimated by detecting engine revolution speeds and a shift position of a gearchange mechanism.

Although the system of the second embodiment uses two groups of control modes, namely the first control-mode group identical to a series of control modes used in the system of the first embodiment and the second control-mode group based on the conventional select-LOW method, three groups of control modes may be selected depending upon vehicle traveling conditions. For instance, during braking on turns the abovenoted first control-mode group is selected, and during traveling on a split-μ road the second control-mode group is selected. When the vehicle is operated in a traveling state except both during braking on turns and during traveling on the split-μ road, a third control-mode group may be selected. The third control-mode group corresponds to a conventional four-channel, four-sensor independent anti-skid brake control according to which rear wheels as well as front wheels are controlled independently of each other on the basis of the respective slip ratios monitored at the rear wheels.

In the shown embodiments, although the wheel-speed arithmetic circuits 15FL, 15FR, 15RL and 15RR, the select-HIGH switch 16 and the pseudo vehicle speed generator 17 are constructed as external parts, the microcomputer 25 may be designed to contain functions of these parts 15FL to 15RR, 16 and 17.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An anti-skid control system for an automotive vehicle, comprising:

a plurality of actuators associated with one of four road wheels located respectively at front-left, front-right, rear-left and rear-right positions of the vehicle, for adjusting braking forces applied to the four road wheels independently of each other;

sensors for detecting wheel speeds of the four road wheels to generate wheel-speed indicative signals;

a pseudo vehicle speed generator for estimating a pseudo vehicle speed as a function of at least a highest one of values of the wheel-speed indicative signals;

a calculator for calculating slip ratios of the road wheels as a function of the pseudo vehicle speed and each of the wheel-speed indicative signal values; and a controller having a comparator for comparing each of the slip ratios of the road wheels with a reference slip ratio to produce a skid-control signal for each of the actuators for regulating the actuators in response to the control signals;

wherein the controller is configured to control an actuator associated with a rear wheel subjected to skid control, so that a skid control for the rear wheel is in correlation with a skid control for a diagonal front wheel located on the vehicle diagonally to the rear wheel subjected to skid control and so that a braking force of the rear wheel subjected to skid control is adjusted toward a value essentially equivalent to a braking force of the diagonal front wheel via the correlative skid control.

2. An anti-skid control system as claimed in claim 1, wherein the controller is further configured to select a lower value of both a value of the wheel-speed indicative signal of the rear wheel subjected to skid control and a value of the wheel-speed indicative signal of the diagonal front wheel, and regulate the actuator associated with the rear wheel subjected to skid control in accordance with the said lower value.

3. An anti-skid control system as claimed in claim 1, wherein the controller is further configured to simultaneously regulate the actuator associated with a diagonal rear wheel located on the vehicle diagonally to a front wheel subjected to skid control at a pressure-reduction mode in synchronization with shifting of the actuator associated with the front wheel subjected to skid control to the pressure-reduction mode, only when the pressure-reduction mode is selected at the front wheel subjected to skid control.

4. An anti-skid control system as claimed in claim 1, which further comprises decision means for deciding whether a traveling condition of the vehicle corresponds to a particular condition in which a high wheel-load difference between inner and outer wheels occurs during braking on turns, and wherein the controller is further configured to regulate the actuator associated with the rear wheel subjected to skid control according to the correlative skid control when the decision means decides that the particular condition is satisfied, and regulate the actuators associated with the respective rear wheels in common with each other in accordance with a lower one of values of the wheel-speed indicative signals of the rear wheels when the decision means decides that the particular condition is unsatisfied.

5. An anti-skid control system as claimed in claim 4, wherein the controller is further configured to simultaneously regulate the actuator associated with a diagonal rear wheel located on the vehicle diagonally to a regulated front wheel of the four road wheels at a pressure-reduction mode in synchronization with shifting of the actuator associated with the front wheel subjected to skid control to the pressure-reduction mode only when the particular condition is satisfied and additionally the pressure-reduction mode is selected at the front wheel subjected to skid control, and regulate the actuators associated with the respective rear wheels in common with each other in accordance with a lower one of values of the wheel-speed indicative signals of the rear wheels when the decision means decides that the particular condition is unsatisfied.

6. An anti-skid control system as claimed in claim 5, wherein the particular condition is based on whether the pseudo vehicle speed exceeds a preset value so that the decision means decides that the particular condition is satisfied when the pseudo vehicle speed is above the preset value and that the particular condition is unsatisfied when the pseudo vehicle speed is below the preset value.

\* \* \* \* \*